US010725467B2

(12) United States Patent
Meier (10) Patent No.: US 10,725,467 B2
(45) Date of Patent: Jul. 28, 2020

(54) SYSTEM FOR PERSONALIZING THE DRIVING BEHAVIOR OF AUTONOMOUS DRIVING SYSTEMS BASED ON A VEHICLE'S LOCATION

(71) Applicant: Robert Bosch GmbH, Stuttgart (DE)

(72) Inventor: Michael R. Meier, Walled Lake, MI (US)

(73) Assignee: Robert Bosch GmbH, Stuttgart (DE)

(*) Notice: Subject to any disclaimer, the term of this patent is extended or adjusted under 35 U.S.C. 154(b) by 277 days.

(21) Appl. No.: 15/856,410

(22) Filed: Dec. 28, 2017

(65) Prior Publication Data

US 2019/0204823 A1 Jul. 4, 2019

(51) Int. Cl.
*G05D 1/00* (2006.01)
*G05D 1/02* (2020.01)

(52) U.S. Cl.
CPC ......... *G05D 1/0022* (2013.01); *G05D 1/0011* (2013.01); *G05D 1/0066* (2013.01); *G05D 1/0088* (2013.01); *G05D 1/021* (2013.01); *G05D 2201/0213* (2013.01)

(58) Field of Classification Search
CPC .. G05D 1/0022; G05D 1/0066; G05D 1/0011; G05D 1/021; G05D 1/0088; G05D 2201/0213
See application file for complete search history.

(56) References Cited

U.S. PATENT DOCUMENTS

| 9,266,533 B2 | 2/2016 | Zhao | |
|---|---|---|---|
| 9,623,878 B2 | 4/2017 | Tan et al. | |
| 9,816,827 B1* | 11/2017 | Slusar | G06Q 10/00 |
| 2002/0161513 A1* | 10/2002 | Bechtolsheim | G01C 21/3667 701/454 |
| 2009/0276135 A1* | 11/2009 | Hagemann | B60W 30/16 701/96 |
| 2014/0012479 A1* | 1/2014 | Zhao | B60K 31/0008 701/96 |
| 2016/0159350 A1* | 6/2016 | Pilutti | B60W 30/143 701/23 |
| 2016/0304092 A1 | 10/2016 | Rebhan et al. | |
| 2017/0057517 A1* | 3/2017 | Huq | B60W 50/082 |
| 2017/0131719 A1* | 5/2017 | Micks | B60W 40/08 |
| 2017/0282917 A1 | 10/2017 | Pilutti et al. | |

* cited by examiner

*Primary Examiner* — Thomas Ingram
(74) *Attorney, Agent, or Firm* — Michael Best & Friedrich LLP (57) ABSTRACT

A system for adapting a driving behavior of an autonomous driving system of a vehicle. The system includes a sensor, a braking system, an acceleration control system, a steering system, and an electronic processor. The electronic processor is configured to receive data from the sensor, send the data to a server, and send, to the server, a request for a value associated with an action the vehicle is performing and a location of the vehicle. The electronic processor is also configured to receive the value from the server and adapt the driving behavior of the autonomous driving system of the vehicle based on the value by controlling at least one selected from a group comprising the braking system, the acceleration control system, and the steering system.

17 Claims, 7 Drawing Sheets

SYSTEM FOR PERSONALIZING THE DRIVING BEHAVIOR OF AUTONOMOUS DRIVING SYSTEMS BASED ON A VEHICLE'S LOCATION

FIELD

Embodiments relate to adapting the driving behavior of a vehicle equipped with driver assistance technology or so-called "autonomous" driving systems based on the location of the vehicle.

BACKGROUND

Many modern day vehicles are equipped with partially-autonomous driving systems. For example, some vehicles include adaptive cruise control (ACC) systems, highway assist (HWA) systems (which often combines a lane keeping feature with a distance management feature), or other similar systems.

SUMMARY

While partially-autonomous systems have several advantages, there is a need to adapt these systems so that the behavior of the vehicle controlled by these systems fits the typical or average driving behavior of other vehicles in the location of the vehicle with the partially-autonomous driving systems. Adapting these systems in this way, among other things, improves traffic flow and helps prevent driver frustration.

One embodiment provides a system for adapting a driving behavior of an autonomous driving system of a vehicle. The system includes a sensor, a braking system, an acceleration control system, a steering system, and an electronic processor. The electronic processor is configured to receive data from the sensor, send the data to a server, and send, to the server, a request for a value associated with an action the vehicle is performing and a location of the vehicle. The electronic processor is also configured to receive the value from the server and adapt the driving behavior of the autonomous driving system of the vehicle based on the value by controlling at least one selected from a group comprising the braking system, the acceleration control system, and the steering system.

Another embodiment provides a method of adapting a driving behavior of an autonomous driving system of a vehicle. The method includes receiving, from a sensor, data, sending the data to a server, and sending, to the server, a request for a value associated with an action the vehicle is performing and a location of the vehicle. The method also includes receiving the value from the server and adapting the driving behavior of the autonomous driving system of the vehicle based on the value by controlling at least one selected from a group comprising a braking system, an acceleration control system, and a steering system.

Yet another embodiment provides a system for adapting a driving behavior of an autonomous driving system of a vehicle. The system includes a sensor, a braking system, an acceleration control system, a steering system, and an electronic processor. The electronic processor is configured to receive data from the sensor and compute, based on the received data, a value of a driving behavior associated with a driver for each action the autonomous driving system is capable of performing. The electronic processor is also configured to adapt the driving behavior of the autonomous driving system of the vehicle based on the value by controlling at least one selected from a group comprising the braking system, the acceleration control system, and the steering system.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the various components.

Figure 1:
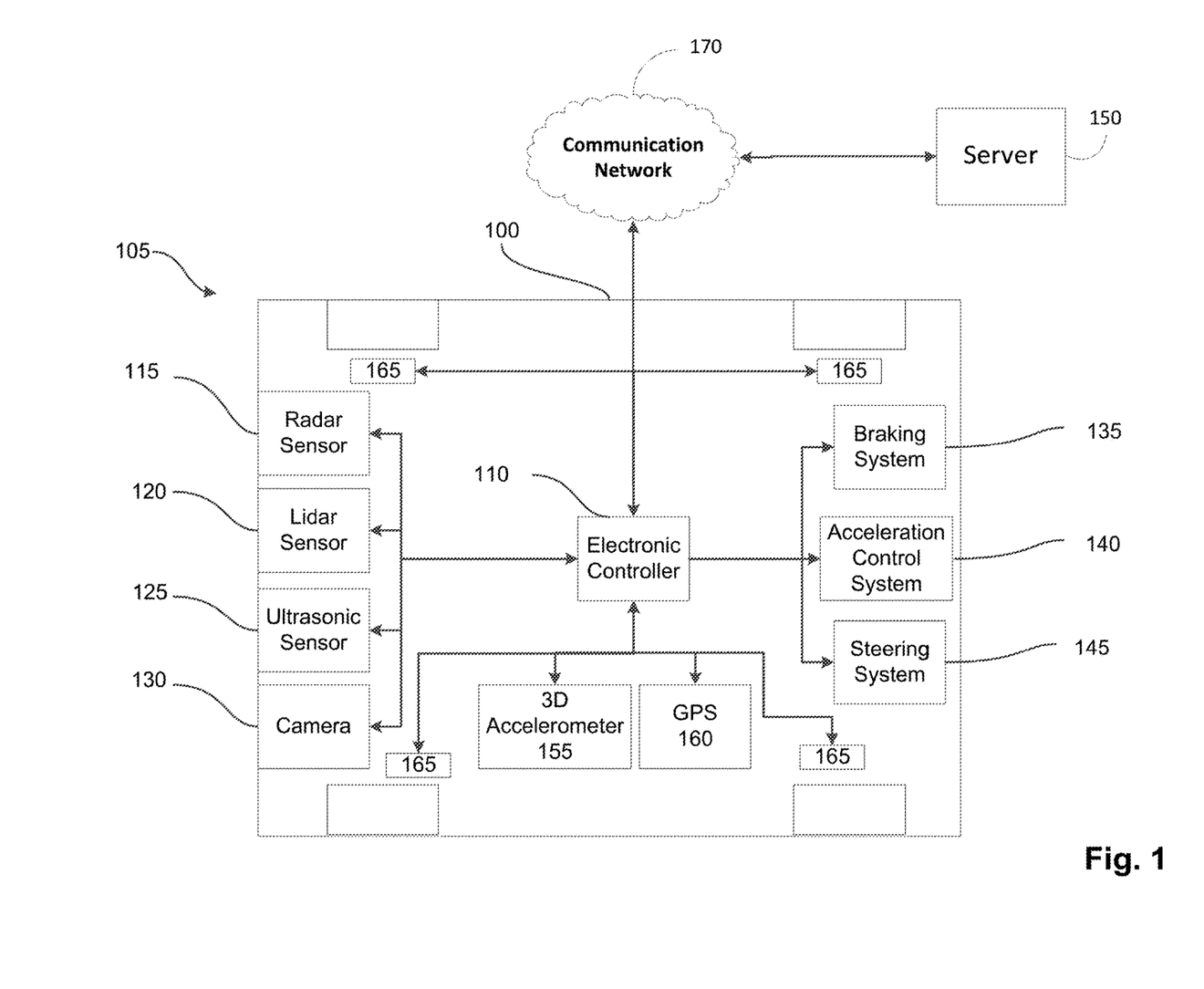
FIG. 1 is a block diagram of a vehicle equipped with a system for adapting the driving behavior of a partially-autonomous driving system of the vehicle.

FIG. 1 illustrates a vehicle 100 equipped with a system 105 for adapting the driving behavior of a partially-autonomous driving system of the vehicle 100. In the description that follows, in some instances, embodiments may be described as "autonomous." It should be understood that embodiments may relate to autonomous systems or more practically to systems that require driver participation. The vehicle 100, although illustrated as a four-wheeled vehicle, may encompass various types and designs of vehicles. For example, the vehicle 100 may be an automobile, a motorcycle, a truck, a bus, a semi-tractor, or another type of vehicle. The vehicle 100 has some autonomous functionality, but may also require a driver or operator to perform driving functions. In the example illustrated, the system 105 includes several hardware components including an electronic controller 110, a radar sensor 115, a lidar sensor 120, an ultrasonic sensor 125, a camera 130, a braking system 135, an acceleration control system 140, a steering system 145, a server 150, a three-dimensional accelerometer 155, a geographical positioning system (GPS) 160, and speed sensors 165. It should be understood that while the system 105 is illustrated as including the radar sensor 115, lidar sensor 120, and camera 130 the system 105 may include the radar sensor 115, lidar sensor 120, camera 130, or a combination thereof. The components of the system 105 may be of various constructions and may use various communication types and protocols.

The electronic controller 110 may be communicatively connected to the radar sensor 115, lidar sensor 120, ultrasonic sensor 125, camera 130, braking system 135, acceleration control system 140, steering system 145, three-dimensional accelerometer 155, GPS 160, and speed sensors 165 via various wired or wireless connections. For example, in some embodiments, the electronic controller 110 is directly coupled via a dedicated wire to each of the above-listed components of the system 105. In other embodiments, the electronic controller 110 is communicatively coupled to one or more of the components via a shared communication link such as a vehicle communication network or bus (for example, a controller area network (CAN) bus, an Ethernet, or a FlexRay) or a wireless connection. The electronic controller 110 is communicatively connected to the server 150 via a wireless communication network 170. Portions of the wireless communication network 170 may be implemented using a wide area network, such as the Internet, a local area network, such as a Bluetooth™ network or Wi-Fi, and combinations or derivatives thereof. It should be understood that the server 150 may communicate with any number of vehicles.

There may be more than one of each of the radar sensor 115, lidar sensor 120, ultrasonic sensor 125, and camera 130 and they may be located at different positions on the interior or exterior of the vehicle 100. For example, the camera 130, or components thereof, may be externally mounted to a portion of the vehicle 100 (such as on a side mirror or front end). Alternatively the camera 130, or components thereof, is internally mounted within the vehicle 100 (for example, positioned on the dashboard or by the rearview mirror). The radar sensor 115, lidar sensor 120, ultrasonic sensor 125, and camera 130 are configured to receive signals indicative of the vehicle's distance from and position relative to, vehicles in the vehicle's surrounding environment as well as the distance and position of vehicles in the vehicle's surrounding environment relative to each other.

In some embodiments, the speed sensors 165 are implemented using wheel speed sensors that sense rotational speed. In other embodiments, vehicle speed is sensed or determined using other sensors alone or in combination with wheel speed sensors, for example, a transmission output speed sensor (TOSS) or other types of sensors. In the embodiment shown, a single speed sensor 165 is associated with each wheel of the vehicle 100.

Each of the above-listed components of the system 105 may include dedicated processing circuitry including an electronic processor for receiving, processing, and transmitting data associated with the functions of each component. For example, the three-dimensional accelerometer 155 may include an electronic processor that determines the parameters relating to the vehicle's directional motion. In this case, the three-dimensional accelerometer 155 transmits the parameters or calculated values associated with the parameters to the electronic controller 110. Each of the components of the system 105 may communicate with the electronic controller 110 using various communication protocols. The embodiment illustrated in FIG. 1 provides but one example of the components and connections of the system 105. However, these components and connections may be constructed in other ways than those illustrated and described herein.

Figure 2:
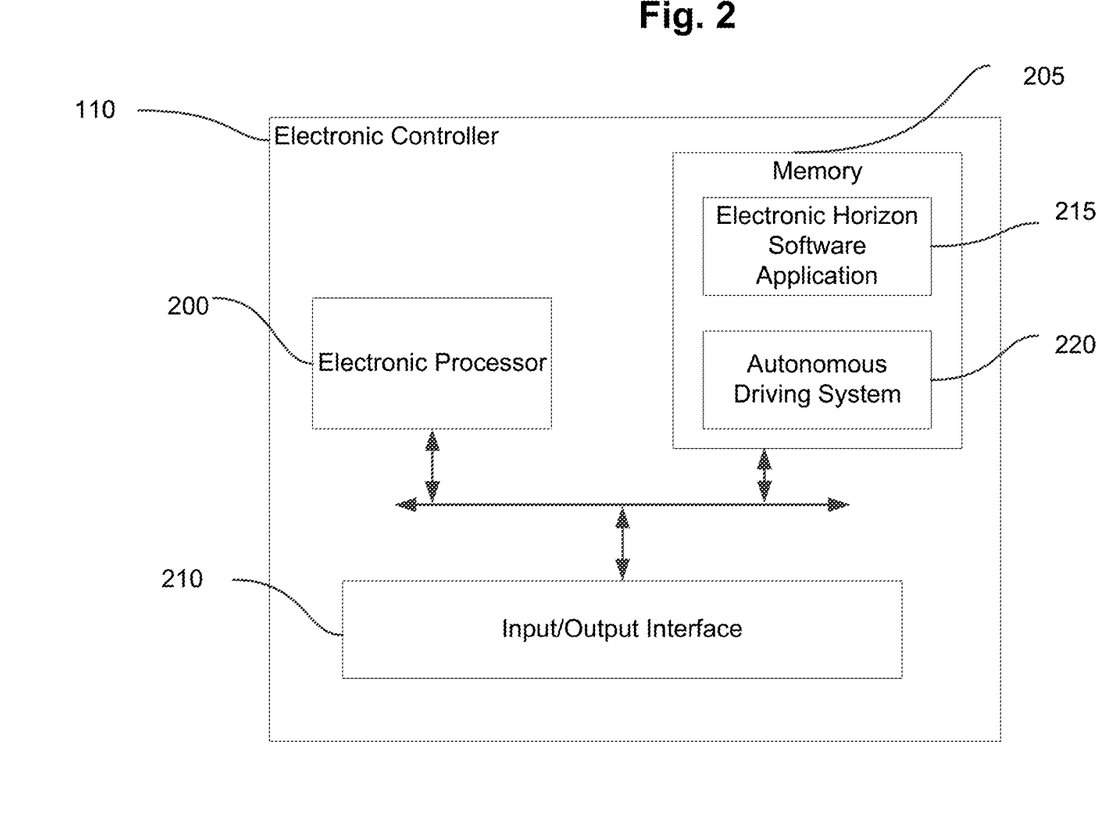
FIG. 2 is a block diagram of an electronic controller of the system of FIG. 1.

FIG. 2 is a block diagram of the electronic controller 110 of the system 105 of FIG. 1. The electronic controller 110 includes a plurality of electrical and electronic components that provide power, operation control, and protection to the components and modules within the electronic controller 110. The electronic controller 110 includes, among other things, an electronic processor 200 (such as a programmable electronic microprocessor, microcontroller, or similar device), a memory 205 (for example, non-transitory, machine readable memory), and an input/output interface 210. The electronic processor 200 is communicatively connected to the memory 205 and the input/output interface 210. The memory includes an electronic horizon software application 215 and an autonomous driving system 220. The electronic horizon software application 215 contains instructions that when executed by the electronic processor 200 cause the adjustment or adaption of a driving behavior of the vehicle 100 based on a value from the server 150. The autonomous driving system 220, for example ACC or HWA, controls the actions of the vehicle 100 with limited or no input from the driver of the vehicle 100. The radar sensor 115, lidar sensor 120, ultrasonic sensor 125, camera 130, braking system 135, acceleration control system 140, steering system 145, the server 150, three-dimensional accelerometer 155, GPS 160, and speed sensors 165 communicate with the electronic processor 200 via the input/output interface 210. The electronic processor 200, in coordination with the memory 205 and the input/output interface 210, is configured to implement, among other things, the methods described herein.

The electronic controller 110 may be implemented in several independent controllers (for example, programmable electronic controllers) each configured to perform specific functions or sub-functions. Additionally, the electronic controller 110 may contain sub-modules that include additional electronic processors, memory, or application specific integrated circuits (ASICs) for handling input/output functions, processing of signals, and application of the methods listed below. In other embodiments, the electronic controller 110 includes additional, fewer, or different components.

Figure 3:
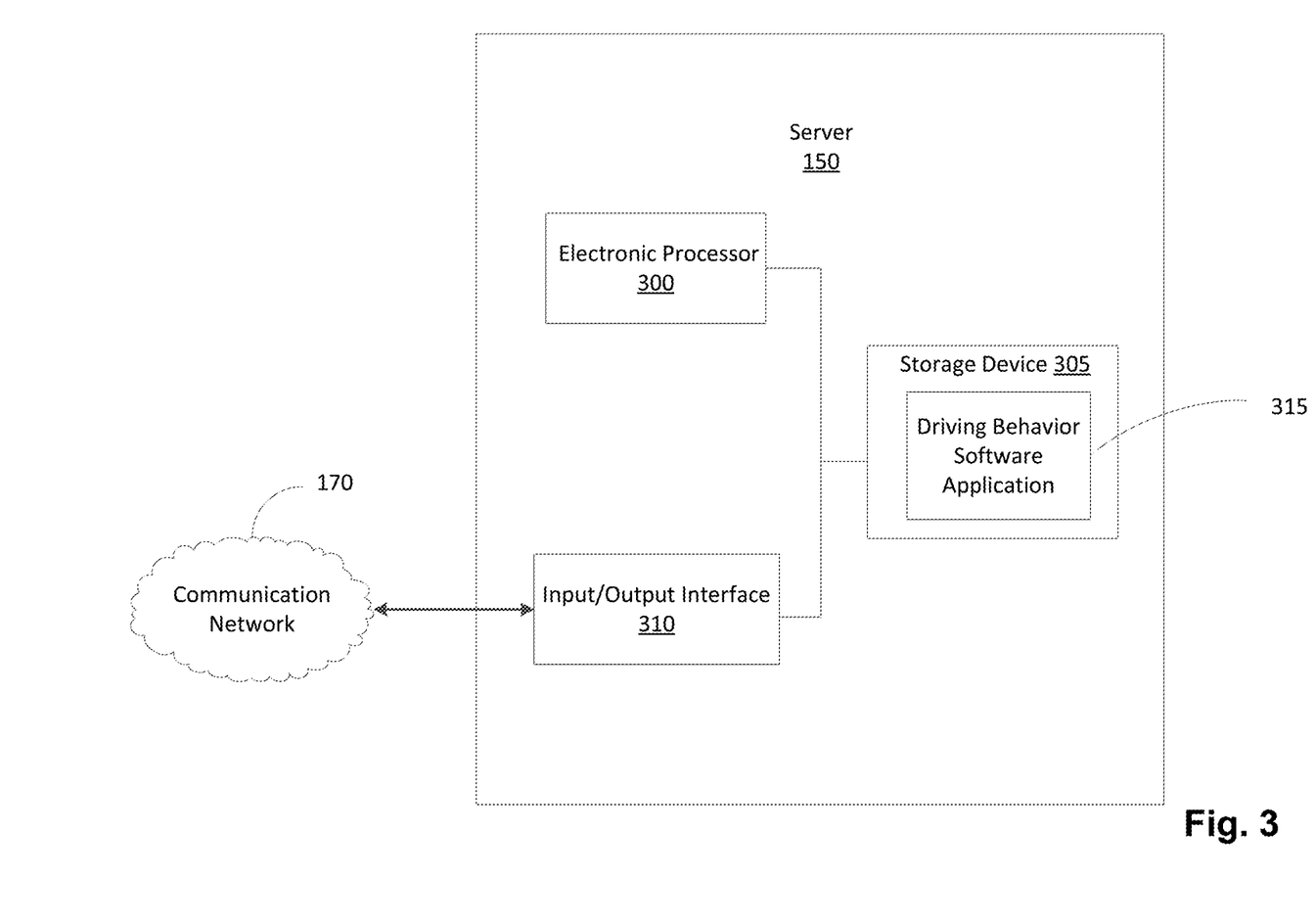
FIG. 3 is a block diagram of a server of the system of FIG. 1.

As illustrated in FIG. 3, the server 150 is an electronic device that includes an electronic processor 300 (for example, a microprocessor, application-specific integrated circuit (ASIC), or another suitable electronic device), a storage device 305 (for example, a non-transitory, computer-readable storage medium), and a communication interface 310, such as a transceiver, for communicating over the wireless communication network 170 and, optionally, one or more additional communication networks or connections. The electronic processor 300, the storage device 305, and the communication interface 310 communicate over one or more communication lines or buses. It should be understood that the server 150 may include additional components than those illustrated in FIG. 3 in various configurations and may perform additional functionality than the functionality described in the present application. The functionality described herein as being performed by the server 150 may be performed by the electronic processor 200. Also, the functionality described herein as being performed by the server 150 may be distributed among multiple devices, such as multiple servers operated within a cloud environment.

The electronic processor 300 included in the server 150 executes instructions stored in the storage device 305. In particular, as illustrated in FIG. 3, the storage device 305 stores a driving behavior software application 315. The driving behavior software application 315 processes data received from vehicles at a plurality of locations over time and generates a value that represents the average driving behavior for an action in a location.

It should be understood that the driving behavior software application 315 may be stored or distributed among multiple storage devices 305 within the server 150 (or multiple servers) and the functionality described herein as being performed by the driving behavior software application 315 may be combined and distributed in various configurations.

Figure 4:
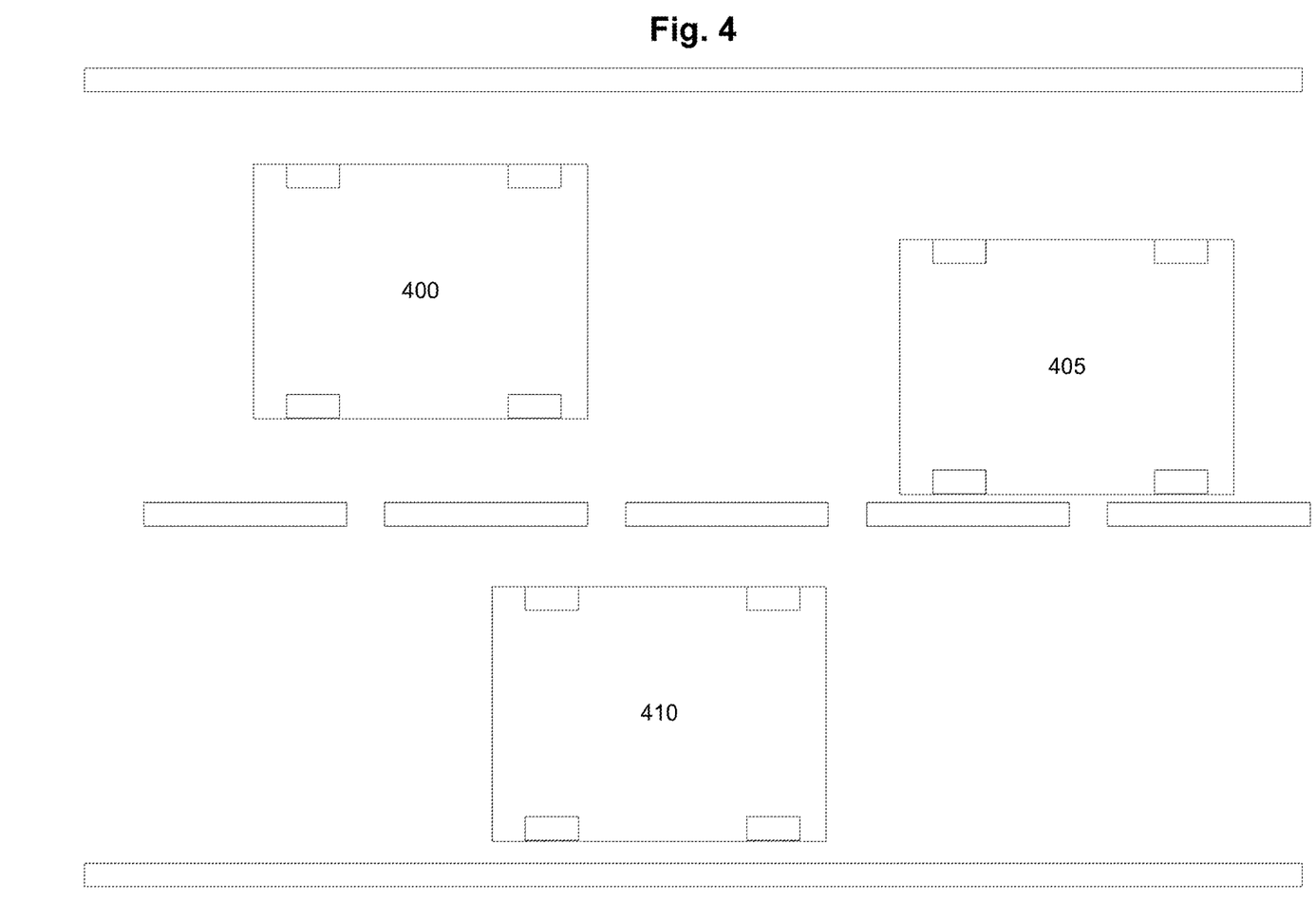
FIG. 4 is an illustration of driving behaviors of vehicles on a road.

FIG. 4 is a block diagram of three vehicles 400, 405, 410 equipped with the system 105 and traveling on a road 415. Vehicle 400 has adaptive cruise control activated and is following vehicle 405 at a relatively constant time to collision. The time to collision is the time it takes the vehicle 400 to make contact with the vehicle 405 if the vehicle 405 stopped moving and vehicle 400 continued to move at the same speed. The time to collision the vehicle 400 maintains with respect to the vehicle 405 is a driving behavior of the action of following vehicle 405. The driving behavior (specifically the following behavior) of vehicle 400 varies depending on the geographical location of the road 415 and the type of road the road 415 is. For example, if the road 415 is a highway in California the vehicle 400 may generally follow the vehicle 405 at a time to collision of about 1.3 seconds whereas if the road 415 is a highway in Indiana the vehicle 400 may generally follow the vehicle 405 at a time to collision of about 2.1 seconds. In another example, if the road 415 is a highway in California the vehicle 400 may generally follow the vehicle 405 at a time to collision of about 1.3 seconds whereas if the road 415 is a local street in California the vehicle 400 may generally follow the vehicle 405 at a time to collision of about 1.8 seconds. The driving behavior also changes based on whether the road 415 is in an urban area or a rural area. It is beneficial to adapt the time to collision maintained by the vehicle 400 based on the time to collision generally maintained by vehicles in the same geographical location and on the same type of road as the vehicle 400, in order to, for example, prevent other vehicles from cutting in front of the vehicle 400 and allow the vehicle 400 to blend in with other vehicles in the surrounding environment of the vehicle 400.

The vehicle 405 has highway assist activated and is cutting in front of vehicle 410, or performing a cut-in. The vehicle 405 maintains a time to collision (cut-in behavior) relative to the vehicle 410 as the vehicle 405 cuts in front of the vehicle 410. In this example, the time to collision is the time it would take for the vehicle 410 to come into contact with the vehicle 405 if the vehicle 405 stopped and the vehicle 410 continued to move at the same speed. The driving behavior (time to collision) of vehicle 400 varies depending on the geographical location of the road 415 and the type of road the road 415 is. For example, if the road 415 is in California, the vehicle 405 may generally maintain a time to collision of about 2 seconds. If the road 415 is in Indiana, the vehicle 405 may generally maintain a time to collision of about 3 seconds. It should be understood that the driving behavior will change based on whether the road 415 is in an urban area or a rural area. Other values, or cut-in behaviors, associated with cutting in (for example, the time it takes for a vehicle to change lanes and how quickly the vehicle cutting in accelerates or decelerates) also vary depending on the geographical location of the road 415 and the type of road the road 415 is. Therefore, it is beneficial to adapt the cut-in behavior of the vehicle 405 depending on the general cut-in behavior maintained by vehicles in the same geographical location and on the same type of road as the vehicle 405 so that, for example, the vehicle 405 blends in with other vehicles in the surrounding environment of the vehicle 405 and the vehicle 405 is able to quickly cut in front of a vehicle (decrease the time it takes for the vehicle 405 to change lanes) in an area where it is common for vehicles accelerate quickly to reduce the distance between them and the vehicle that they are following.

Figure 5:
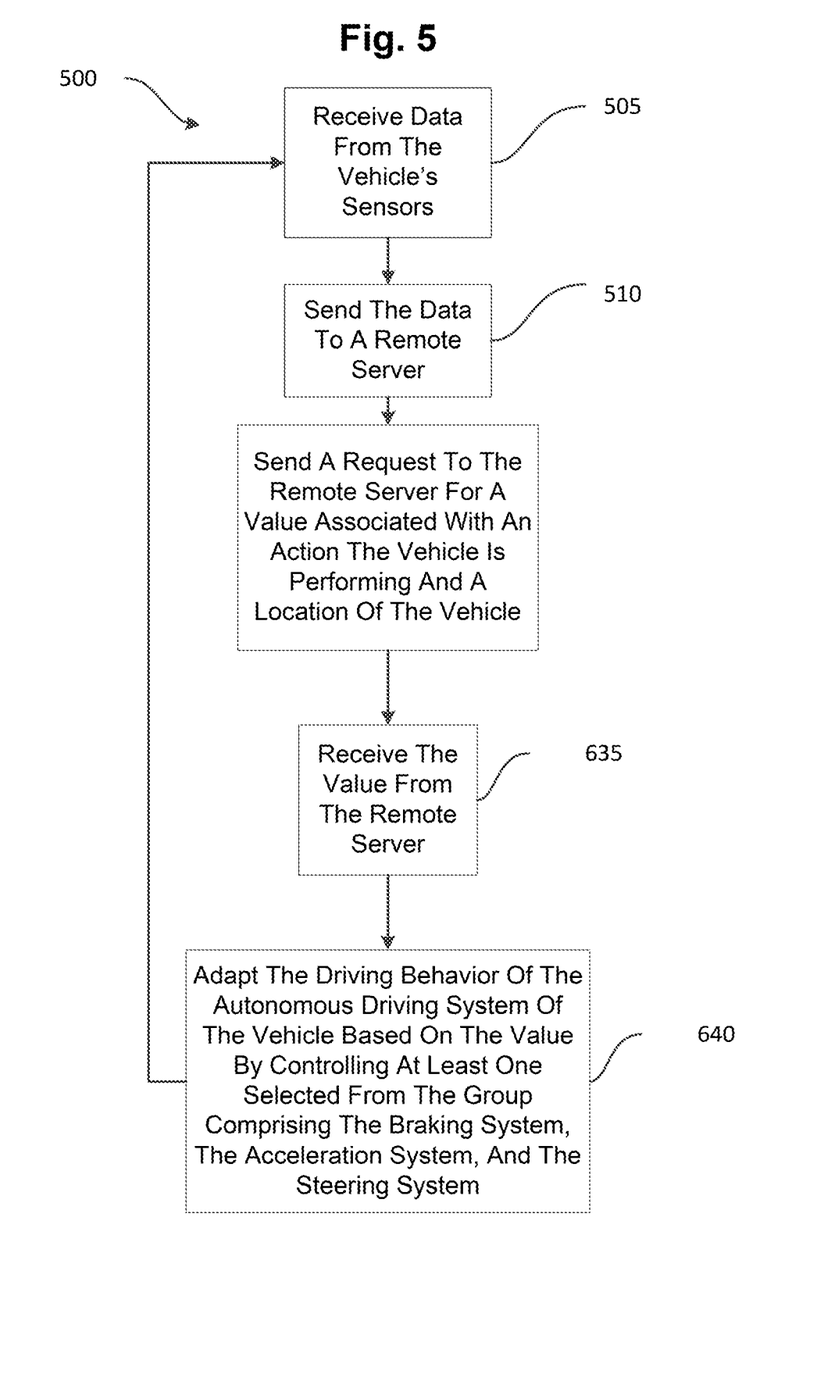
FIG. 5 is a flowchart of a method of adapting a driving behavior of a partially-autonomous driving system of a vehicle equipped with the system of FIG. 1.

FIG. 500 is a flow chart of a method for adapting an autonomous driving system of a vehicle based on the location of the vehicle. In the example provided, the electronic processor 200 of the vehicle 100 receives, from a sensor (for example, the radar sensor 115, lidar sensor 120, ultrasonic sensor 125, or camera 130) data regarding the position of the vehicle 100 relative to other vehicles in the vehicle's surrounding environment and the position of the other vehicles in the vehicle's surrounding environment relative to each other. The electronic processor 200 also receives from the GPS 160 the location of the vehicle 100 and receives, from the three-dimensional accelerometer 155 and speed sensors 165, data about the action the autonomous driving system 220 of the vehicle 100 is performing (for example, is the vehicle 100 following another vehicle, changing lanes, or the like) (block 505). The electronic processor 200 sends the data it receives to the server 150 (block 510).

Figure 6:
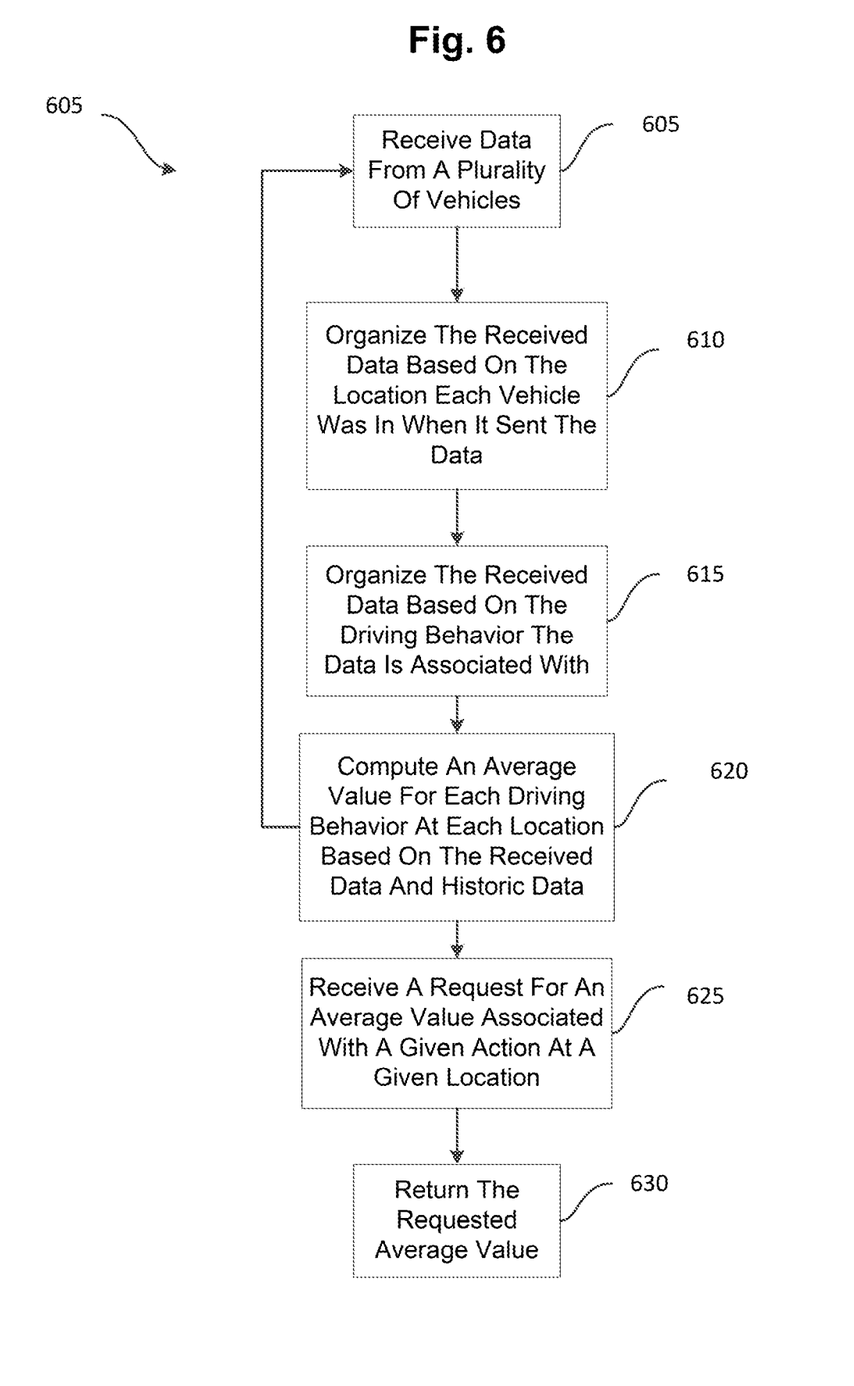
FIG. 6 is a flowchart of a method of generating a value utilized by the method illustrated in FIG. 5.

FIG. 600 illustrates the way the server 150 processes the data that it receives from a plurality of vehicles. The data the server 150 receives from a vehicle (for example, vehicle 100) of the plurality of vehicles includes data representing the driving behavior of the vehicle sending the data to the server 150 and the driving behavior of vehicles in the surrounding environment of the vehicle sending data to the server 150 (block 605). The data includes, for example, an action the vehicle is performing, a value (driving behavior) associated with the action that the vehicle is performing, and a location of the vehicle when the vehicle performs the action. The action is, for example, following another vehicle or cutting in front of (or behind) another vehicle, as described above. The values represent, for example, the time to collision between a leading vehicle and a following vehicle, the time a vehicle takes to cut in between two vehicles, and the time to collision for a vehicle that is cutting in relative to a vehicle that is being cut in front of. The server 150 organizes the data based on the location of the vehicle (block 610) and the action being performed (block 615) using the driving behavior software application 315. For each type of action performed in each location the server 150 computes an average value describing the action in the location (block 620). The average value is computed using the values included in the data received from each of the plurality of vehicles and associated with the action in the location. The server 150 stores each average value and updates the average values as it receives more data. Therefore, the average values are a product of historical data that the server 150 has received from a plurality of vehicles over time.

When the vehicle 100 sends a request to the server 150 (block 622) and server 150 receives a request from the vehicle 100 (block 625) (via the electronic horizon software application 215) for a value associated with a specific action (the action the vehicle is performing or will perform in a short period of time) in a specific location (the location of the vehicle) the server 150 finds and returns to the vehicle 100 (via the electronic horizon software application 215) the average value it calculated for the action in the location (block 630). Returning to FIG. 5, upon receiving the value returned by the server 150 (block 635), the electronic processor 200 adapts the driving behavior of the vehicle 100 based on the returned value so that the driving behavior of the vehicle 100 matches the average or typical driving behavior of other vehicles in the location. The electronic processor 200 adapts the driving behavior of the autonomous driving system 220 of the vehicle 100 by controlling at least one selected from the group of the braking system 135, the acceleration control system 140, and the steering system 145 (block 640). The electronic processor 200 adapts the driving behavior of the autonomous driving system 220 of the vehicle 100 if a value that represents the driving behavior of the autonomous driving system 220 and is based on the data from the radar sensor 115, lidar sensor 120, ultrasonic sensor 125, camera 130, three-dimensional accelerometer 155, and speed sensors 165 does not match the value returned by the server 150. For example, if the vehicle 100 is following another vehicle at a time to collision that is less than the time to collision (the value) returned by the server 150 then the electronic processor 200 adjusts the speed of the vehicle by using the braking system 135 to slow the vehicle 100. The vehicle 100 continues to send data to and request values from the server 150 as the vehicle 100 changes location and performs different actions.

Figure 7:
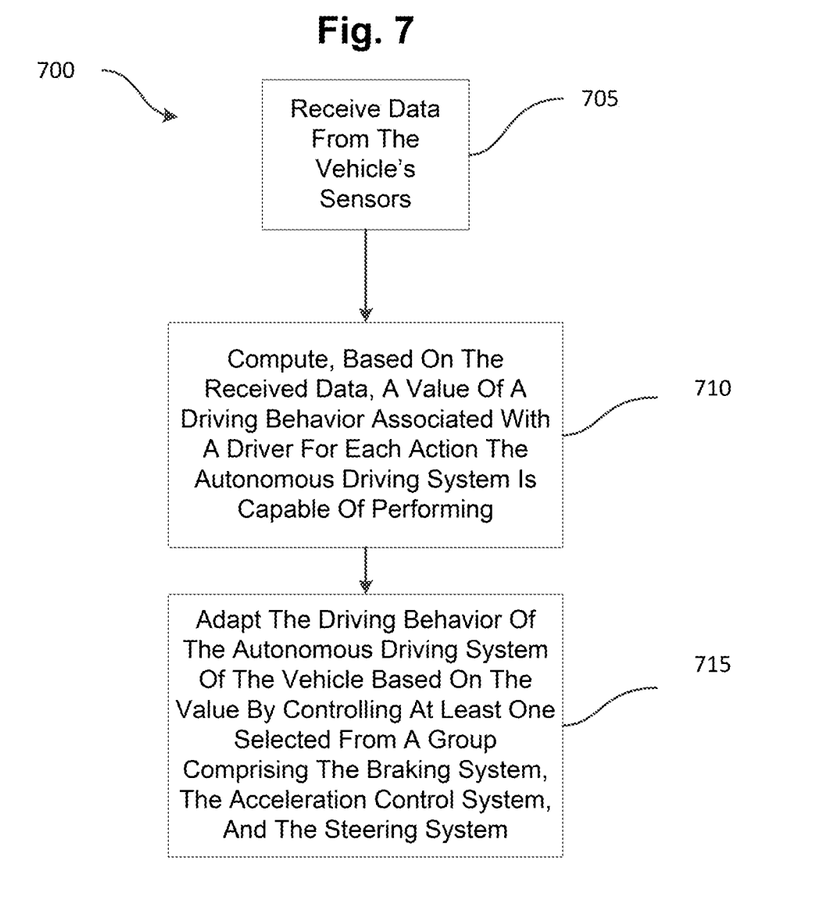
FIG. 7 is a flowchart of a method of adapting a driving behavior of a partially-autonomous driving system of a vehicle equipped with the system of FIG. 1.

Additionally, in some embodiments, using the system 105 described above, the electronic processor 200 adapts the driving behavior of the autonomous driving system 220 based on the driving behavior of a driver of the vehicle. The electronic processor 200 determines an average value for the driving behavior of the driver based on the data the electronic processor 200 receives over time, from a sensor (for example, the radar sensor 115, lidar sensor 120, ultrasonic sensor 125, or camera 130) regarding the position of the vehicle 100 relative to other vehicles in the vehicle's surrounding environment. The electronic processor 200 also receives, from the three-dimensional accelerometer 155 and speed sensors 165, data about the action the driver of the vehicle 100 is performing when the driving behavior is measured (block 705). The action, for example, is the vehicle 100 following another vehicle, cutting in front of or behind another vehicle, or the like.

The electronic processor 200 computes and stores in the memory 205 a value (for example, an average of the data collected over time for the driving behavior) associated with the driving behavior of the driver for each action the autonomous driving system 220 has the ability to perform (block 710). The electronic processor 200 adapts the driving behavior of the autonomous driving system 220 of the vehicle 100 if a value that represents the driving behavior of the autonomous driving system 220 and is based on the data from the radar sensor 115, lidar sensor 120, ultrasonic sensor 125, camera 130, three-dimensional accelerometer 155, and speed sensors 165 does not match the value that represents the driving behavior of the driver of the vehicle 100. The electronic processor 200 adapts the driving behavior of the autonomous driving system 220 of the vehicle 100 by controlling at least one selected from the group of the braking system 135, the acceleration control system 140, and the steering system 145 (block 715). For example, if the vehicle 100 is following another vehicle at a time to collision that is less than the time to collision (the value) stored in memory 205 representing the driving behavior of the driver when the driver is controlling the vehicle 100 to follow another vehicle then the electronic processor 200 adjusts the speed of the vehicle 100 by using the braking system 135 to slow the vehicle 100.

Various features and advantages of some embodiments are set forth in the following claims.

What is claimed is:

1. A system for adapting a driving behavior of an autonomous driving system of a vehicle, the system comprising
   a sensor;
   a braking system;
   an acceleration control system;
   a steering system; and
   an electronic processor, configured to
      receive data from the sensor;
      send the data to a server;
      send, to the server, a request for a value, wherein the value describes an average driving behavior associated with an action the vehicle is performing and a location of the vehicle;
      receive the value from the server;
      adapt the driving behavior of the vehicle based on the value received from the server so that a value representing the driving behavior of the vehicle matches the value received from the server by controlling at least one selected from a group comprising the braking system, the acceleration control system, and the steering system.

2. The system according to claim 1, wherein the driving behavior is a cut-in behavior and the action is a cut-in.

3. The system according to claim 1, wherein the value is computed from historical data and the received data associated with the action and the location.

4. The system according to claim 3, wherein the server is configured to organize the data based on the location of the vehicle and the driving behavior of the vehicle and generate the average value for each action at each location based on the historical data the server has received from a plurality of vehicles over time.

5. The system according to claim 3, wherein the electronic processor is configured to execute an electronic horizon software application stored in a memory connected to the electronic processor.

6. The system according to claim 1, wherein the location includes a geographical location of the vehicle and a type of road the vehicle is traveling on.

7. The system according to claim 1, wherein the data includes values representing the driving behavior for the action the vehicle is performing and each action other vehicles surrounding the vehicle are performing.

8. The system according to claim 1, wherein the driving behavior is a following behavior.

9. A method of adapting a driving behavior of an autonomous driving system of a vehicle, the method comprising
   receiving, from a sensor, data;
   sending the data to a server;
   sending, to the server, a request for a value associated with an action the vehicle is performing and a location of the vehicle;
   receiving the value from the server, wherein the value describes an average driving behavior for the action the vehicle is performing in the location of the vehicle; and
   adapting the driving behavior of the vehicle so that a value representing the driving behavior of the vehicle matches the value received from the server by controlling at least one selected from a group comprising a braking system, an acceleration control system, and a steering system.

10. The method according to claim 9, wherein adapting a driving behavior of an autonomous driving system of a vehicle includes adapting a cut-in behavior.

11. The method according to claim 9, wherein receiving the value from the server includes receiving a value computed from historical data and the received data associated with the action and the location.

12. The method according to claim 11, the method further comprising organizing, with the server, the data based on the location of the vehicle and the driving behavior of the vehicle and generating the average value for each action at each location based on the historical data the server has received from a plurality of vehicles over time.

13. The method according to claim 9, wherein sending, to the server, a request for a value associated with an action the vehicle is performing and a location of the vehicle includes sending, to the server, a geographical location of the vehicle and a type of road the vehicle is traveling on.

14. The method according to claim 9, wherein sending the data to a server includes sending values representing the driving behavior for the action the vehicle is performing and each action other vehicles surrounding the vehicle are performing.

15. The method according to claim 9, wherein adapting a driving behavior of an autonomous driving system of a vehicle includes adapting a following behavior.

16. A system for adapting a driving behavior of an autonomous driving system of a vehicle, the system comprising
    a sensor;
    a braking system;
    an acceleration control system;
    a steering system; and
    an electronic processor, configured to
        receive data from the sensor;
        compute, based on the received data, a value that describes an average driving behavior associated with a driver for each action the autonomous driving system is capable of performing;
        adapt the driving behavior of the vehicle so that a value representing the driving behavior of the vehicle matches the value describing the average driving behavior by controlling at least one selected from a group comprising the braking system, the acceleration control system, and the steering system.

17. The system according to claim 16, wherein the driving behavior is a cut-in behavior.

* * * * *